Nov. 3, 1970      M. BRISKI      3,537,263
HYDROKINETIC POWER TRANSMISSION HAVING A BY-PASS CHARGING VALVE
Filed Feb. 26, 1969
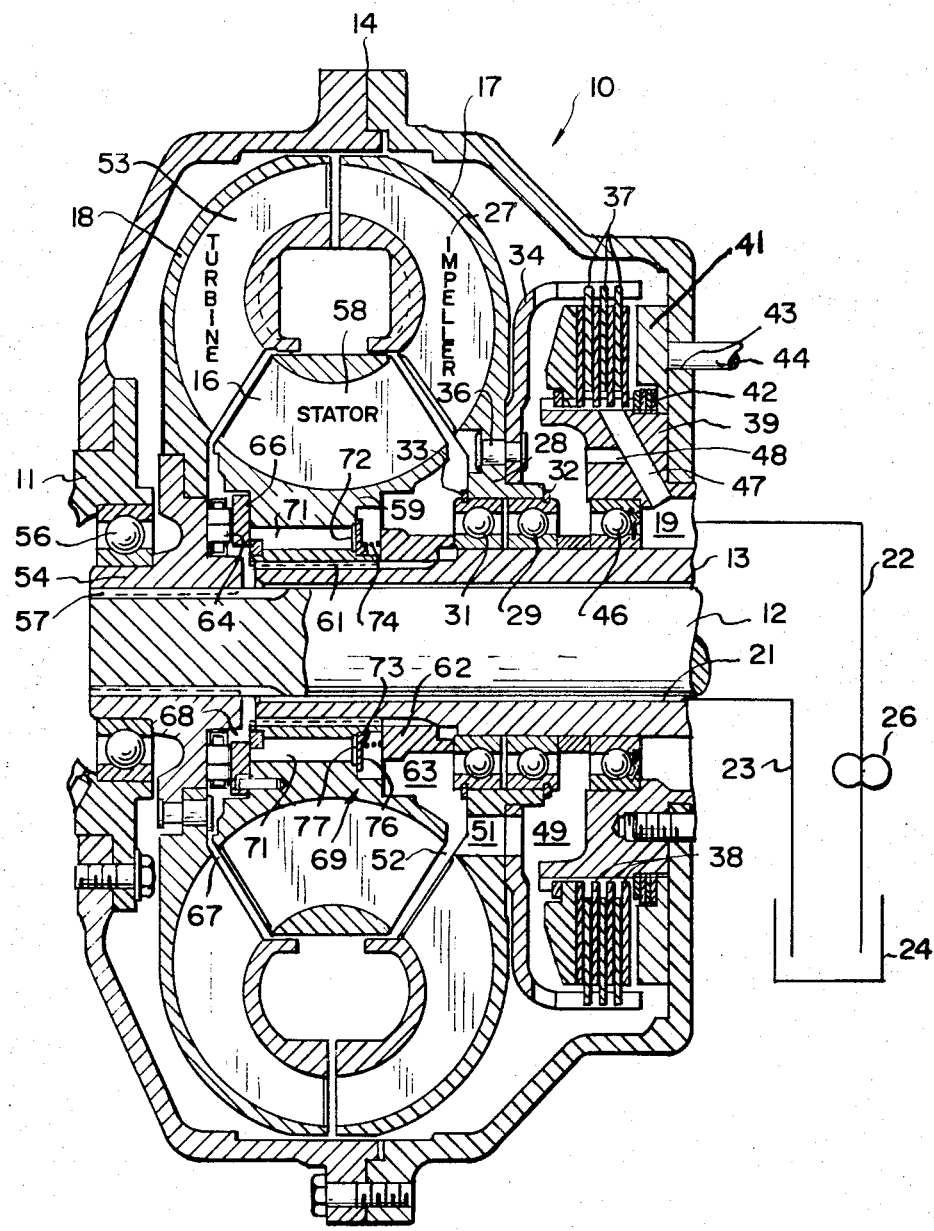
INVENTOR.
MICHAEL BRISKI
BY Herman E. Smith
ATTORNEY.

United States Patent Office 3,537,263
Patented Nov. 3, 1970

3,537,263
HYDROKINETIC POWER TRANSMISSION HAVING A BY-PASS CHARGING VALVE
Michael Briski, Rockford, Ill., assignor to Borg Warner Corporation, Chicago, Ill., a corporation of Delaware
Filed Feb. 26, 1969, Ser. No. 802,532
Int. Cl. F16d 33/00
U.S. Cl. 60—54                               4 Claims

ABSTRACT OF THE DISCLOSURE

A hydrokinetic torque converter is connected to a constant flow external circuit for circulating cooling fluid therethrough, and includes a by-pass valve arranged to recirculate charging fluid therein for maintaining the fluid charge in the converter and providing a constant cooling flow during changes in speed ratios.

SUMMARY OF THE INVENTION

The present invention relates generally to hydrokinetic torque converters and more particularly to an improved construction affording recirculation of fluid therein.

In a torque converter of the present type, it is desirable to provide a continuous flow of fluid through the unit in order to maintain the fluid within an acceptable temperature range during operation. However, operation of the unit at various speed ratios results in corresponding variations in the fluid pressure heads within the unit tending to vary the cooling flow through the unit.

It is an object of the present invention to provide an improved construction of converter permitting a predetermined cooling flow through the unit throughout its range of speed ratios; a further object is to provide such a converter for use with an external fluid circuit having substantially constant flow characteristics.

BRIEF DESCRIPTION OF THE DRAWING

The figure is a fragmentary section view of a transmission mechanism according to the present invention.

DESCRIPTION OF THE PREFERRED EMBODIMENT

Referring now in more detail to the drawing, the reference character 10 generally indicates a hydrokinetic power transnmission. Transmission 10 includes a rotatable input shaft 11, a rotatable output shaft 12, a non-rotatable ground sleeve 13, and a housing 14 enclosing a torque converter having a stator 16, a rotatable impeller 17 and a rotatable turbine 18. The impeller, turbine and stator include bladed portions 27, 53 and 58 defining a toroidal chamber for the torque converter.

Portions of housing 14 and ground sleeve 13 define an inlet fluid passage 19, while portions of ground sleeve 13 and output shaft 12 define an outlet fluid passage 21. Passages 19 and 21 are connected to a fluid circuit indicated schematically by inlet conduit 22, outlet conduit 23, sump 24 and pump 26. The size of pump 26 is determined by a preselected amount of cooling flow to be circulated through the connector.

Rotatable impeller 17 includes a bladed portion 27 and a hub portion 28 rotatably mounted on ground sleeve 13 by means of a pair of ball bearings 29, 31 and retainer rings 32, 33. Impeller hub portion 27 is secured to a clutch element 34 by means of rivets such as 36. Clutch element 34 is connected to a group of clutch discs 37 alternately engaging a group of friction plates 38. Friction plates 38 are inturn connected to a hub portion 39 of housing 14. A pressure plate 41 is mounted on hub portion 39 for axial movement toward and from clutch discs 37 and friction plates 38. A spring 42 is arranged to bear against pressure plate 41, urging pressure plate 41 away from the friction plates. An aperture 43 is provided in housing 14 for receiving an external actuating member 44 arranged to move pressure plate 41 into clamping engagement with a terminal friction plate 38 thereby clamping friction plates 38 and clutch discs 37 together for establishing a driving connection between housing 14 and impeller 17.

Hub portion 39 of housing 14 is rotatably mounted on ground sleeve 13 by means of ball bearings 46. Hub portion 39 also includes a pair of fluid passages 47, 48 communicating with inlet fluid passage 19. Clutch element 34 and housing hub portion 39 together define a fluid cavity 49 communicating with inlet passage 19 through passages 47, 48 and with the bladed portion 27 of impeller 17 through the aperture 51 and inlet port 52.

Turbine 18 includes a bladed portion 53 and a hub portion 54, hub portion 54 being rotatably mounted in input shaft 11 by means of ball bearing 56 and being drivingly connected to output shaft 12 by means of splines 57.

Stator 16 includes a bladed portion 58 and a hub portion 59 mounted on ground sleeve 13 by means of splines 61. Stator hub portion 59 is axially spaced from impeller hub portion 28 by means of spacer sleeve 62 defining an annular fluid supply chamber 63, and positioning the bladed portion of the stator with respect to the bladed portion of the impeller to define inlet port 52. Stator hub portion 59 is axially spaced from turbine hub portion 54 by means of thrust bearing 64 and spacer 66 defining an annular fluid exhaust chamber 68, and positioning the bladed portion of the stator with respect to the bladed portion of the turbine to define an outlet port 67.

By-pass check valve means 69 includes one or more by-pass passages 71 extending through stator hub portion 59 terminating in an annular groove 72, and a movable pressure responsive valve element in the form of an annular plate member 73. Annular plate member 73 is biased to a first position by means of the spring 74 compressed between one face 76 thereof and spacer sleeve 62. In said first position valve plate member 73 has its one face 76 exposed to fluid in supply chamber 63 and its opposite face 77 masking by-pass passages 71 and annular groove 72 where it is exposed to fluid from exhaust chamber 68.

OPERATION

The operation of the transmission can be more readily understood by tracing the flow of fluid through the mechanism. A predetermined fluid flow is provided by pump 26 and conducted to inlet passage 19 by means of conduit 22. Fluid is conducted from inlet passage 19 to fluid cavity 49 by passages 47 and 48. It is to be noted that a portion of the fluid may be circulated between the plates 37, 38 and returned to cavity 49. From cavity 49, fluid is conducted through aperture 51 to annular supply chamber 63 and inlet port 52. Fluid flows into the toroidal chamber through inlet port 52 and undergoes toroidal flow through the bladed portions of the impeller, turbine and stator exiting through outlet port 67 into exhaust chamber 68. Fluid flows from exhaust chamber 68 through outlet passage 21 to conduit 23 and pump 24.

The charge fluid, or fluid undergoing toroidal flow in the bladed portions of the impeller, turbine and stator is subjected to varying inlet and outlet pressure heads depending upon the varying speed ratios of the impeller and turbine. In order to maintain a constant cooling flow through the mechanism throughout its range of speed ratios, the by-pass check valve 69 is provided. The spring 74, valve plate face 76 and annular groove 72 are proportioned to provide a predetermined differential pressure between supply chamber 63 and exhaust chamber 68. By-pass check valve 69 thus regulates the pressure differential existing across inlet passage 19 and outlet passage 21 assuring constant flow of cooling fluid through the mechanism. When the mechanism is operating at speed ratios tending to create higher exhaust pressures relative to the supply pressure, the exhaust fluid pressure is exerted against face 77 of valve plate 73 moving it against the bias of spring 74 to permit recirculation of fluid from exhaust chamber 68 to supply chamber 63. Thus the amount of charge fluid undergoing toroidal flow and the amount of cooling flow remain substantially constant throughout the range of speed ratios.

While a preferred form of the invention has been shown and described in the foregoing description and drawing, it is to be understood that modifications and alternate constructions thereof remain within the spirit of the invention and scope of the following claims.

What is claimed:

1. A hydrokinetic power transmission mechanism having a fluid inlet passage and a fluid outlet passage adapted for connection to a fluid circuit including means for circulating a quantity of cooling fluid through said mechanism; said mechanism including a rotatable impeller adapted for connection to a rotatable input member, a rotatable turbine adapted for connection to a rotatable output member, and a stator, said impeller, turbine and stator having bladed portions situated in toroidal fluid flow relationship defining a toroidal chamber; said stator and impeller defining an inlet port in said toroidal chamber communicating with said inlet passage for receiving cooling fluid, said stator and turbine defining an outlet port in said toroidal chamber communicating with said outlet passage for exhausting cooling fluid; and by-pass valve means connected between said outlet and inlet ports by passing said outlet and inlet passages having a movable pressure responsive valve element arranged and disposed therein for selectively recirculating a portion of fluid from said outlet port to said inlet port for maintaining a predetermined charge of fluid in said toroidal chamber and a predetermined cooling flow through said mechanism during changes in the speed ratio of said impeller and turbine.

2. A power transmission mechanism according to claim 1 wherein said movable valve element has one face exposed to fluid under inlet port pressure and an opposite face exposed to fluid under outlet port pressure, said valve element being biased to a first position preventing recirculation of fluid from said outlet port to said inlet port and being movable from said first position in response to a preselected increase in outlet port pressure relative to inlet port pressure permitting recirculation of a portion of fluid from said outlet port to said inlet port, said valve element thereby automatically regulating the flow of cooling and charging fluid in said mechanism in response to differences inlet and outlet pressures.

3. A power transmission mechanism according to claim 1 wherein said stator includes a hub portion defining in part an annular fluid supply chamber communicating with said inlet port, and an annular exhaust chamber commuicating with said outlet port, said valve means including at least one by-pass extending through said stator hub between said supply and exhaust chambers, said movable valve element including an annular plate member biased toward a position in sealing engagement with said by-pass passage and movable therefrom in response to a preselected unbalance of pressures in said supply and exhaust chambers for permitting fluid flow from said exhaust chamber toward said supply chamber.

4. A power transmission according to claim 3 wherein said stator hub includes an annular groove communicating with said by-pass passage, said valve element plate member including one face exposed to contact with the fluid under supply chamber presssure and an opposite face having a portion defined by said annular groove exposed to contact with fluid under exhaust chamber pressure.

References Cited

UNITED STATES PATENTS

| 2,190,830 | 2/1940 | Dodge. |
| 2,548,272 | 4/1951 | Seybold. |
| 2,719,440 | 10/1955 | Banker. |
| 2,782,658 | 2/1957 | Schaefer et al. |
| 3,147,595 | 9/1964 | Liang. |
| 3,238,726 | 3/1966 | Jandasek. |
| 3,263,522 | 8/1966 | General. |

EDGAR W. GEOGHEGAN, Primary Examiner

UNITED STATES PATENT OFFICE
CERTIFICATE OF CORRECTION

Patent No. 3,537,263    Dated November 3, 1970

Inventor(s) Michael Briski

It is certified that error appears in the above-identified patent and that said Letters Patent are hereby corrected as shown below:

Column 4, line 10, after "differences" insert -- in --; line 17, after "by-pass" insert -- passage --; line 28, cancel "the".

Signed and sealed this 13th day of April 1971.

(SEAL)
Attest:

EDWARD M. FLETCHER, JR.  
Attesting Officer

WILLIAM E. SCHUYLER, JR.  
Commissioner of Patents